April 1, 1930.　　　　G. ORBIN　　　　1,753,131
RESILIENT WHEEL
Filed Nov. 9, 1928　　　　2 Sheets-Sheet 1
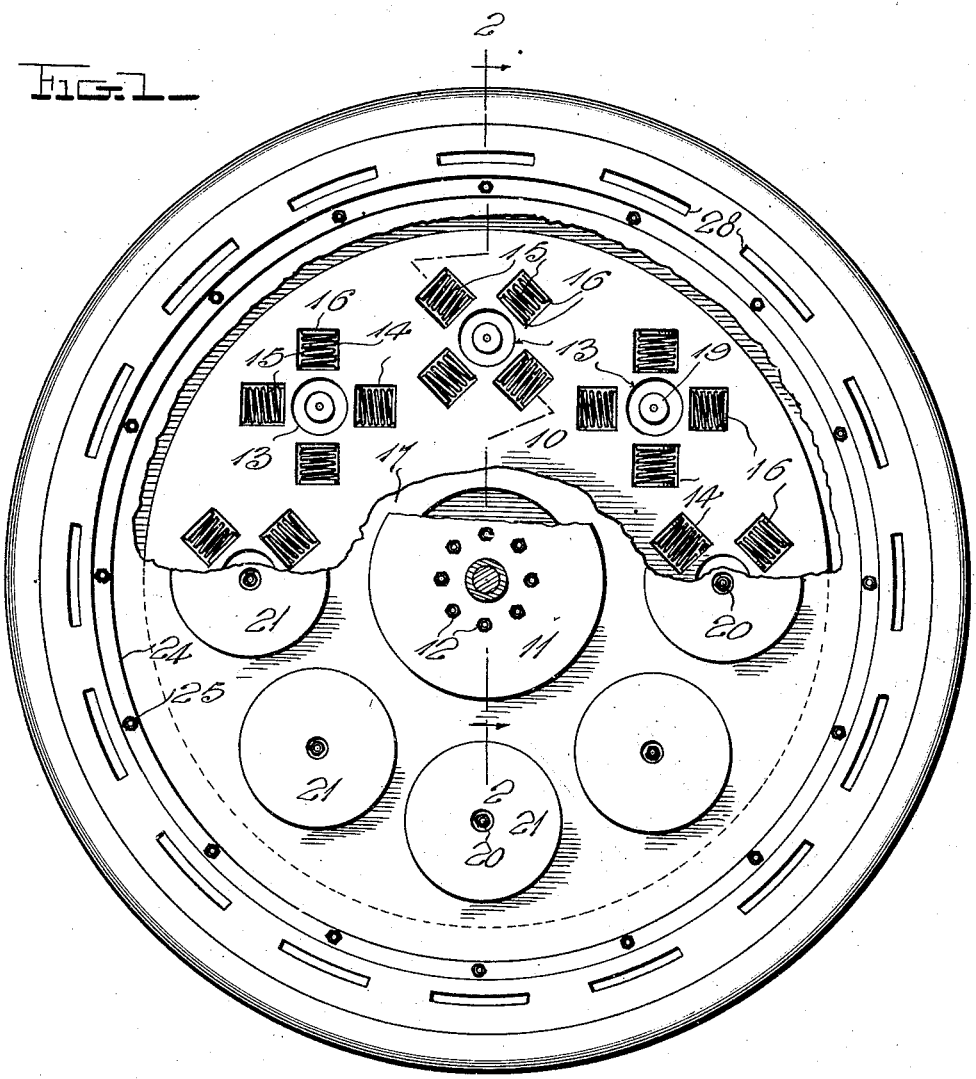

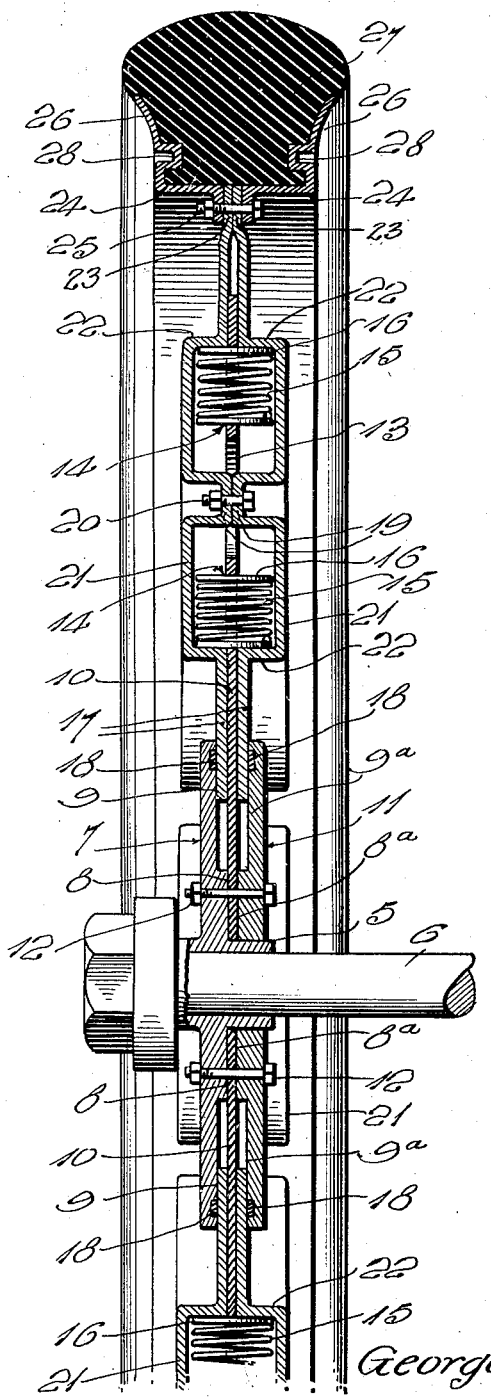

Patented Apr. 1, 1930

1,753,131

UNITED STATES PATENT OFFICE

GEORGE ORBIN, OF SMOCK, PENNSYLVANIA, ASSIGNOR OF ONE-HALF TO NICK FRANCHETTI, OF SMOCK, PENNSYLVANIA

RESILIENT WHEEL

Application filed November 9, 1928. Serial No. 318,233.

The invention aims to provide an exceptionally simple and inexpensive, yet an efficient and desirable resilient wheel of the disk type, and with this object in view, the invention resides in the novel subject matter hereinafter described and claimed, description being accomplished by reference to the accompanying drawing.

Fig. 1 is a side elevation partly broken away and in section.

Fig. 2 is an enlarged vertical section on line 2—2 of Fig. 1.

The form of construction herein disclosed, will be specifically described, with the understanding that within the scope of the invention as claimed, minor variations may be made.

The numeral 5 denotes a hub which may be constructed for use either upon a back axle 6 or a front spindle. Integral with and projecting outwardly from the hub 5, is a flange 7 having inner and outer steps 8—9 of annular form. A hub-carried disk 10 lies against the step 8 and is spaced from the step 9, and a ring 11 is provided at the side of the disk opposite the flange 7. This ring is formed with inner and outer annular steps 8ª—9ª, the former being in contact with the disk 10 while the latter is outwardly spaced from said disk. Bolts 12 pass through the parts 7—11—10 to tightly secure them together.

At circumferentially spaced points, the disk 10 is formed with preferably circular openings 13 and spaced around each of these openings 13, is a group of preferably rectangular openings 14. Springs 15 are received in the openings 14 for movement on lines radiating from the openings 13, and these lines are all oblique to lines radiating from the center of the wheel. Preferably, washer plates 16 abut the ends of the springs 15, said springs and washer plates projecting laterally in opposite directions from the disk 10.

Two rim-carrying disks 17 have their inner peripheral portions slidably received between the disk 10 and the parts 7—11, said parts preferably having packing grooves 18 to retain a lubricant allowing easy sliding of the parts 17 with respect to the parts 7—10—11. The disks 17 are provided with restricted portions 19 which are received in the openings 13 and are fastened together by bolts 20, and around said portions 19, said disks 17 are provided with annular outwardly bulged portions 21 which encase the springs 15 and the washer plates 16. The outer peripheral walls 22 of these bulged portions 21, abut the outermost of the washer plates 16 and the innermost of said washer plates abut the ends of the openings 14 toward the openings 13.

The outer peripheral edge portions 23 of the disks 17 are directed inwardly into contact with each other, and two sections 24 of a circumferentially divided rim, are fastened to these disk portions by bolts 25. The rim is provided at its outer edges with flanges 26 to embrace a tire 27 and each of these flanges is provided with a plurality of circumferentially elongated and circumferentially spaced ribs 28 which are adapted for reception in corresponding recesses in the sides of the tire, thereby tightly holding tire and rim together and overcoming any possibility of relative creeping.

By the construction shown and described, a resilient wheel is provided which is rather simple and inexpensive, yet is efficient and in every way desirable. The general arrangement of springs disposed in circumferentially spaced groups with the springs of each group oblique to radial lines, insures that upon relative yielding of the hub and tire of the wheel, such yielding shall be cushioned by an unusual number of the springs. Excessive relative movement of the hub-carried disk and the rim-carrying disks however, is prevented by the restricted disk portions 19 loosely received in the openings 13.

I claim:

1. A resilient wheel comprising a hub-carried disk having a plurality of openings spaced outwardly from its center and spaced apart circumferentially, said disk also having a plurality of spring-receiving openings spaced around each of the first named openings, springs in said spring-receiving openings yieldable in directions radiating from said first-named openings, said springs projecting laterally beyond the disk sides, two rim-carrying disks contacting slidably with the sides of said hub-carried disk, said rim-carrying disks having restricted portions loosely received in said first-named openings and outwardly bulged portions around said restricted portions, said outwardly bulged portions jointly receiving said springs and abutting the outer ends thereof, and means securing said restricted disk portions together.

2. A resilient wheel comprising a hub-carried disk having openings spaced outwardly from its center and spaced apart circumferentially, coiled compression springs disposed within said openings and projecting laterally beyond opposite sides of said disk, said springs having their axes disposed in the same plane as said disk, and two rim-carrying disks contacting slidably with the sides of said hub-carried disk, said rim-carrying disks being recessed to receive the laterally projecting portions of said springs and having shoulders abutting one end of each of said springs, the other ends of said springs abutting edges of said openings.

In testimony whereof I have hereunto affixed my signature.

GEORGE ORBIN.